(12) United States Patent
Flood

(10) Patent No.: US 10,726,149 B2
(45) Date of Patent: Jul. 28, 2020

(54) SENSOR DATA ANALYSIS FOR A PLURALITY OF USERS

(71) Applicant: ESSITY HYGIENE AND HEALTH AKTIEBOLAG, Göteborg (SE)

(72) Inventor: Erik Flood, Göteborg (SE)

(73) Assignee: Essity Hygiene and Health Aktiebolag, Gothenburg (SE)

( * ) Notice: Subject to any disclaimer, the term of this patent is extended or adjusted under 35 U.S.C. 154(b) by 665 days.

(21) Appl. No.: 15/121,062

(22) PCT Filed: Feb. 25, 2014

(86) PCT No.: PCT/EP2014/053633
§ 371 (c)(1),
(2) Date: Aug. 24, 2016

(87) PCT Pub. No.: WO2015/127961
PCT Pub. Date: Sep. 3, 2015

(65) Prior Publication Data
US 2016/0371502 A1  Dec. 22, 2016

(51) Int. Cl.
*G06F 16/00* (2019.01)
*G06F 21/62* (2013.01)
(Continued)

(52) U.S. Cl.
CPC .......... *G06F 21/6227* (2013.01); *G06F 16/23* (2019.01); *G06F 16/284* (2019.01);
(Continued)

(58) Field of Classification Search
CPC .. G06F 16/58; G06F 16/9535; G06F 16/9537; G06F 16/5866; G06F 16/345; G06F 16/29; G06F 16/908
See application file for complete search history.

(56) References Cited

U.S. PATENT DOCUMENTS 7,051,039 B1   5/2006 Murthy et al.
8,811,377 B1 * 8/2014 Weston ............ H04W 52/0219
                                                    370/351
(Continued)

FOREIGN PATENT DOCUMENTS

CN         1805371 A     7/2006
CN       202229783 U     5/2012
(Continued)

OTHER PUBLICATIONS

Gnawali, Omprakash, Jongkeun Na, and Ramesh Govindan. "Application-informed radio duty-cycling in a re-taskable multi-user sensing system." 2009 International Conference on Information Processing in Sensor Networks. IEEE, 2009.*
(Continued)

*Primary Examiner* — Nan Hutton
(74) *Attorney, Agent, or Firm* — Wood Herron & Evans LLP

(57) ABSTRACT

A system for providing sensor data analysis to a plurality of users is disclosed. The system includes comprising an interface for receiving sensor data from a plurality of sensors distributed over a plurality of localities, a locality being associated with one or more sensors; a data storage configured to store said sensor data in association with a plurality of nodes, one node being associated to one locality, and sensor data from one specific sensor being associated to the corresponding node, and to store for each node a relationship to itself and to all its sub-nodes as part of a hierarchical structure of said nodes; and a processing entity configured to run one or more instances for each of a plurality of users, each instance accessing said data storage for analyzing the sensor data in response to a user request.

18 Claims, 3 Drawing Sheets

(51) Int. Cl.
*G06F 16/23* (2019.01)
*G06F 16/28* (2019.01)
*G06F 16/901* (2019.01)
*G06F 16/908* (2019.01)

(52) U.S. Cl.
CPC ........ *G06F 16/908* (2019.01); *G06F 16/9027* (2019.01); *G06F 21/6218* (2013.01); *G06F 21/6245* (2013.01); *G06F 2221/2141* (2013.01)

(56) References Cited

U.S. PATENT DOCUMENTS

| | | | |
|---|---|---|---|
| 2004/0103139 | A1 | 5/2004 | Hubbard et al. |
| 2006/0026118 | A1* | 2/2006 | Jung ................. G06F 16/29 |
| 2006/0142978 | A1 | 6/2006 | Suenbuel et al. |
| 2013/0085719 | A1 | 4/2013 | Brun et al. |
| 2014/0280137 | A1* | 9/2014 | Anderson ............. G06F 16/219 707/737 |

FOREIGN PATENT DOCUMENTS

| | | |
|---|---|---|
| CN | 102662378 A | 9/2012 |
| CN | 102692902 A | 9/2012 |
| JP | 2008-217612 A | 9/2008 |
| RU | 110354 U1 | 11/2011 |
| WO | WO-2012/110089 A1 | 8/2012 |

OTHER PUBLICATIONS

Baek, Seung Jun, Gustavo De Veciana, and Xun Su. "Minimizing energy consumption in large-scale sensor networks through distributed data compression and hierarchical aggregation." IEEE Journal on selected Areas in Communications 22.6 (2004): 1130-1140.*

Wang, Liang, et al. "Recognizing multi-user activities using wearable sensors in a smart home." Pervasive and Mobile Computing 7.3 (2011): 287-298.*

Office Action dated Apr. 13, 2018 issued in counterpart European patent application No. 14 706 821.7.

Australian examination report No. 1 dated Feb. 28, 2017 issued in counterpart Australian patent application No. 2014384290 (3 pages).

First Chinese Office Action dated Jun. 5, 2018 issued in corresponding Chinese patent application No. 201480076414.0 (11 pages) and its English-language translation thereof (16 pages).

Wenna, He "*Research of Geological Informationization Based on Internet Things and Cloud Computing in the Era of Big Data*" China Doctoral Dissertations Full-text Database, Information Science and Technology, pp. 1138-1170, Aug. 2013.

Colombian Office Action Oficio N° 2098 dated Mar. 23, 2018 issued in corresponding Colombian patent application No. NC2016/0001322 (15 pages) and it's partial English-language translation thereof (7 pages).

Mexican Office Action No. Folio 72305 dated Aug. 30, 2018 issued in Mexican patent application No. MX/a/2016/010933 (3 pages) and its partial English-language translation thereof (2 pages).

Russian Decision on Grant dated Dec. 26, 2017 issued in corresponding Russian patent application No. 2016137946 (8 pages) and its English-language translation thereof (5 pages).

State Intellectual Property Office (SIPO) of the People's Republic of China, Decision of Rejection, Chinese Patent Application No. 201480076414.0, dated Oct. 10, 2019 (25 pages).

Anonymous: High-availability cluster—Wikipedia, Jan. 4, 2011, XP055444293, URL:https://en.wikipedia.org/w/index.php?title=High-availability_cluster&oldid=405815016.

Anonymous et al: "Bedien-und Beobachtungssyteme SIMATIC HMI—Industry Mall", Mar. 1, 2020, XP055679936, URL:https://mall.industry.siemens.com/mall/de/de/Catalog/Products/9109999.

European Patent Office, Office Action issued in EP14706821.7 dated Apr. 9, 2020, 6 pages.

* cited by examiner

SENSOR DATA ANALYSIS FOR A PLURALITY OF USERS

CROSS-REFERENCE TO PRIOR APPLICATION

This application is a § 371 National Stage Application of PCT International Application No. PCT/EP2014/053633 filed Feb. 25, 2014, which is incorporated herein in its entirety.

TECHNICAL FIELD

The present disclosure relates to the field of acquisition and analysis of data from a plurality of sensors that are distributed over a plurality of localities. More specifically, the present disclosure relates to a system for providing sensor data analysis to a plurality of users and to a method of providing such analysis. The present disclosure also relates to corresponding computer programs and computer program products.

BACKGROUND

It is known from the conventional arts to distribute a plurality of sensors over a plurality of corresponding localities and to collect corresponding sensor data from the distributed sensors at some kind of central entity. Usually, the latter central entity is a server that receives all the sensor data from the sensors as data sources via one or more networks and stores the received sensor data in a database. A user can then access the database for retrieving the raw data from the sensors or process the sensor data in form of various kinds of analyses or reports.

Such systems are today already ubiquitous and find their respective applications in various fields. For example, manufacturing lines are equipped with a multitude of sensors that sense various physical quantities from the individual manufacturing or conveying stages, so as to allow processing and analysis, and, with this, a corresponding control of the manufacturing process as a whole. Further, a multitude of sensors in the sense of distributed data acquisition equipment find their applications also in larger scale systems, such as railway networks, the infrastructure of modern telecommunication networks or facility management. Common to all these applications is that the many sensors of the distributed data acquisition equipment act as data sources and provide continuously, intermittedly, or in response to specific events, corresponding sensor data.

This sensor data is usually collected by means of, for example, one or more networks such as wire-less or wire-bound, short-range or long-range networks (e.g. e.g. IrDA, IEEE802.15.4, Zigbee, RF4CE, SP100, IEEE802.11, Bluetooth™, GSM, PCS, UMTS, 3GPP, LTE, WLAN, LAN, the Internet, and the like). The collected sensor data can then be stored and processed in order to analyze the data for controlling the system that is subject to observation and control by means of the distributed data acquisition equipment. For example, physical quantities sensed as figures at various points of a manufacturing line can be processed and analyzed in order to take the correct actions necessary for maintaining the manufacturing process, controlling the process, or keeping the process as such efficient and/or outside any unstable or harmful regimes.

Besides manufacturing as such, in which distributed data acquisition already took place as part of industrial automation for many years, today also other applications take advantage of distributed data acquisition and its corresponding abilities to supervise and control large systems. For example, in the case of the above-mentioned facility management, distributed data equipment can sense filling levels or consumption figures of various consumables (e.g., printer ink/toner, paper, hand towels, soap, etc.) so as to allow for an efficient management.

It is to be noted that in the above-mentioned examples, the number of individual sensors of the distributed data acquisition equipment is usually large and so will be the amount of sensor data which needs to be stored and processed for analysis. Furthermore, the larger a system becomes that is subject to distributed data acquisition, the more likely it is that the processing of the sensor data for will become complex and, ultimately, exceeds the available processing and storage resources.

Conventional concepts usually employ one database for a specific set of sensors which provide their corresponding sensor data to that database. This database can then be accessed by some processing means for processing the data for analysis. However, these conventional systems are as such closed in the sense that both the database and the processing resources that have access to it usually belong to one owner (e.g. factory owner) so that data analysis is possible only within the realm of that owner. Although two separate owners may run similar systems, efficiency and synergy is not obtained to a satisfying extent, since each system is closed and hence superordinate or shared access is difficult and cumbersome—or simply not possible.

Furthermore, the large number of individual sensors requires specific organization schemes for structuring the large number of individual data sources in a proper and manageable fashion. From the technical point of view, the internal structure of the employed database may need to closely correlate to the chosen organization scheme in terms of the hierarchical structure and the number of implemented hierarchical levels. At the same time, however, complexity of a database usually grows with the square of the number of hierarchical levels in the chosen structure. Therefore, the technical implementation needs to reflect both the actual structure of the distributed data acquisition equipment on the hardware side and also the database complexity on the software side. The implementation of the database is thus closely related to and dependent on the structure of the distributed data acquisition equipment.

There is therefore a need for an improved system for providing sensor data analysis which allows flexible access for analysis by a plurality of users, whilst ensuring efficient technical implementation that both provides dynamic implementation and avoids database complexity exceeding an acceptable and manageable level.

From US 2013/0085719 A1 there is known a system for modeling a building automation system. However, the proposed system does not provide the necessary flexibility for providing any sensor data analysis to a plurality of users.

SUMMARY

According to one aspect, there is provided a system for providing sensor data analysis to a plurality of users. The system includes an interface for receiving sensor data from a plurality of sensors distributed over a plurality of localities, a locality being associated with one or more sensors; a data storage configured to store said sensor data in association with a plurality of nodes, one node being associated to one locality, and sensor data from one specific sensor being associated to the corresponding node, and to store for each node a relationship to itself and to all its sub-nodes as part of a hierarchical structure of said nodes; and a processing entity configured to run one or more instances for each of a plurality of users, each instance accessing said data storage for analyzing the sensor data in response to a user request.

According to another aspect, there is provided a method for providing sensor data analysis to a plurality of users. The method includes the steps of receiving sensor data from a plurality of sensors distributed over a plurality of localities, a locality being associated with one or more sensors; a step of storing said sensor data in association with a plurality of nodes, one node being associated to one locality, and sensor data from one specific sensor being associated to the corresponding node, and to store for each node a relationship to itself and to all its sub-nodes as part of a hierarchical structure of said nodes; and a step of running one or more instances for each of a plurality of users, each instance accessing said stored data for analyzing the sensor data in response to a user request.

BRIEF DESCRIPTION OF THE DRAWINGS

Embodiments of the present invention, which are presented for better understanding of the inventive concepts and which are not the same as limiting the invention, will now be described with reference to the figures in which.

DETAILED DESCRIPTION OF PARTICULAR EMBODIMENTS

Figure 1:
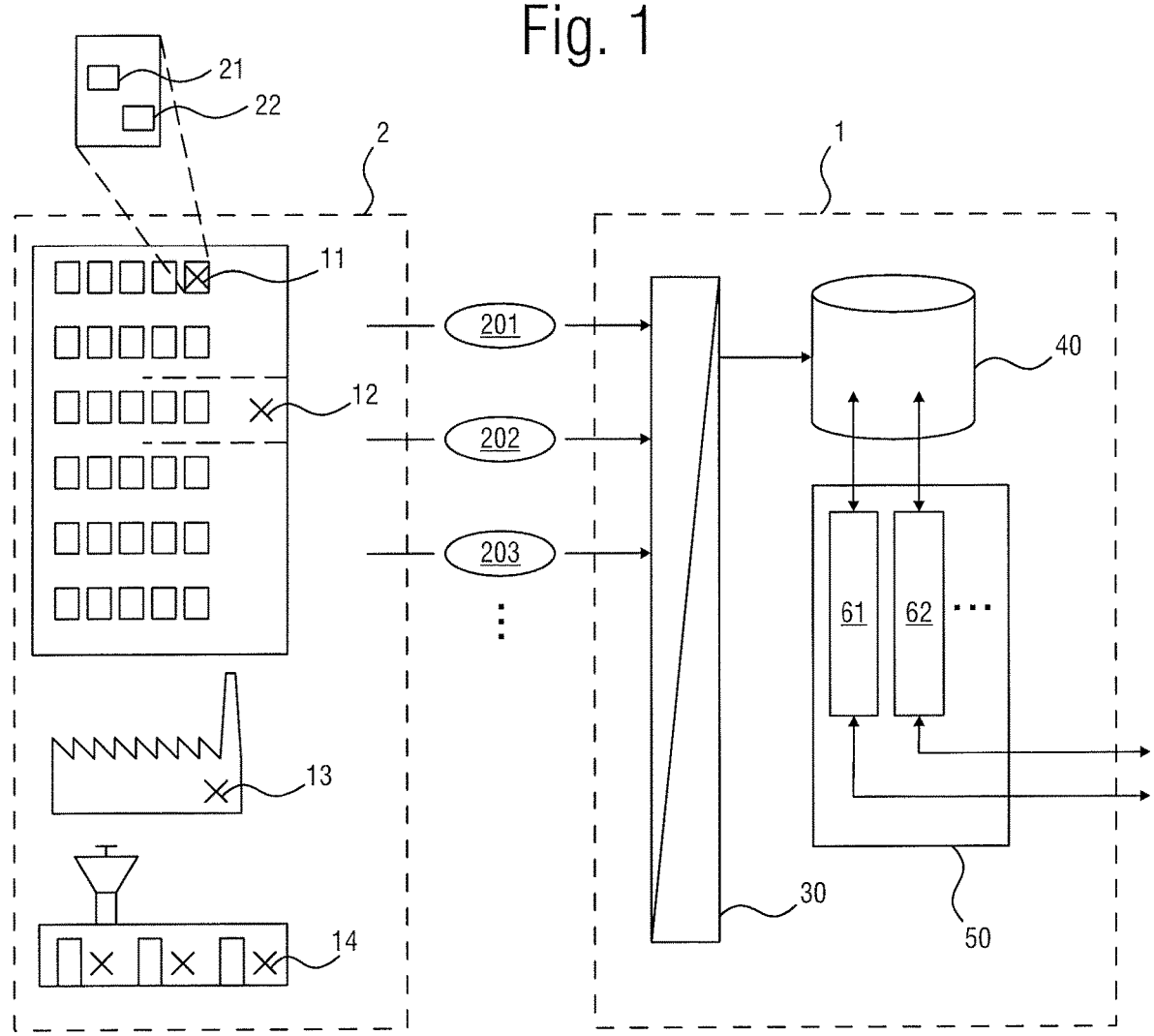
FIG. 1 shows a schematic view of a system for providing sensor data analysis.

FIG. 1 shows a schematic view of a system for providing sensor data analysis. This system 1 includes an interface 30, a data storage 40 as well as a processing entity 50. The interface 30 interacts with a plurality 2 of sensors 21, 22 that act as data sources for sensor data 201, 202, 203, etc., which is received by the interface 30 by means of one or more networks that couple system 1 to the plurality 2 of sensors by means of one or more networks. The network(s) involved may, for example, include a short-range wireless network (e.g. ZigBee, Bluetooth, etc.) that conveys the sensor data from sensor units (sensors) to some kind of intermediate data collection equipment. In a sense, said data collection equipment collects data from one or more sensors and forwards it in bundled fashion to a next entity in the chain, for example, by means of employing an intermediate-range wireless network (e.g. WLAN, GSM, GPRS, UMTS, 3GPP, LTE or similar technologies). From there, the sensor data may be routed via one or more LAN(s) and/or the internet toward system 1. Generally, the system can be seen as a set of methods and data structures and their corresponding implementation.

The plurality 2 of sensors 21, 22 are distributed over a corresponding plurality of localities 11 to 14. In general, a locality is a local entity that can be defined by boundaries, a position, or a location by some sort of spatial information. In this sense, localities usually do not overlap and thus occupy different space. By means of this definition of the so-called localities, examples can be given in the form of rooms 11 of a building, floors 12 of a building, an entire building, site, or business complex (campus) 13, a terminal or gate 14 of an airport, and the like. It should be noted, however, that the term locality covers every spatial entity which can be well defined and clearly delimited from other localities and which can carry one or more sensors. For example, room 11 of the shown building is also drawn in a magnified fashion so as to show its corresponding accommodation of the first sensor 21 and the second sensor 22.

Figure 2:
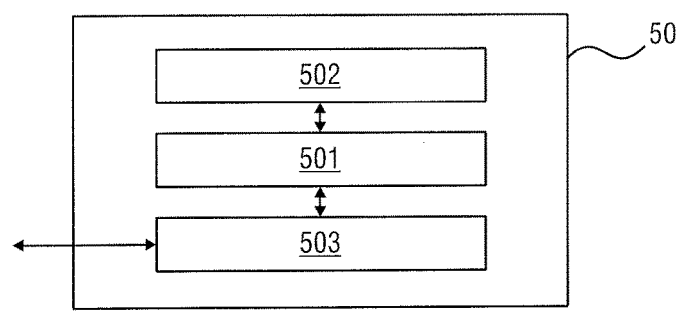
FIG. 2 shows a schematic view of a processing entity.

FIG. 2 shows a schematic view of a processing entity. In general, the term processing entity refers to one of the generally possible implementations of processing. More specifically, processing of sensor data can be implemented by various means as regards the employed hardware and software. The term processing entity thus covers dedicated hardware in the sense that one computer (server, PC, etc.) provides all or most of its processing resources (processing unit, CPU) to the task of implementing the embodiments. Likewise, the term processing entity also covers shared or distributed hardware in the sense that some processing resources implement also other solutions or that an embodiment is distributed over several processing resources of, for example, respective servers of a data center. The software controls the corresponding hardware resource so as to implement the embodiments.

The shown general entity embodiment of FIG. 2 thus includes in the processing entity 50 processing resources 501, memory resources 502, and communication resources 503. The latter communication resources 503 enable the entity 50 to communicate with other parts of the system, such as the interface 30, the data store 40, and/or other networks for providing access to users of the sensor data analysis. It is to be noted, however, that the interface 30 may also be implemented by means of the same processing resources so that communication resources 30 already form part of the interface 30.

Said memory resources 502 store code for instructing the processing resources 501 to implement an embodiment. More specifically, the processing resources 501 implement parts of a system for providing sensor data analysis to a plurality of users. More specifically, the processing resources 501 may be configured to receive sensor data from a plurality of sensors from an interface, or, alternatively may implement together with the communication resources the interface so as to also receive the sensor data from the plurality 2 of sensors via the one or more networks. The plurality of sensors are distributed over a plurality of localities and a locality is associated with one or more sensors as mentioned elsewhere in the present disclosure. In general, however, there is no strict need for each locality having at least one sensor, i.e. the system will also be capable of handling/managing localities that do not have an associated sensor.

The processing entity 50 is further configured, by means of the communication resources 503 to access a data storage 40 that is, in turn, configured to store said sensor data in association with a plurality of nodes, wherein one node is associated to one locality, and the sensor data from one specific sensor is associated to the corresponding node. The data storage 40 is further configured to store for each node a relationship to itself and to all its sub-nodes as part of a hierarchical structure of the nodes. This specific configuration may be implemented by the data storage 40 (e.g. by means of an access interface) or by the storage and access routines as part of the implementation by the processing entity 50. Furthermore, the processing entity 50 is configured to run, by means of its processing resources 501, one or more instances for each of a plurality of users, wherein each instance accesses the data storage 40 for analyzing the sensor data in response to a user request.

The above-mentioned instances are represented by instance 61, 62 running on the processing entity 50 as shown in FIG. 1. As such, an instance is an instantiation of an object that, albeit using the same functionalities defined by the object, can run independent from other instances. In a sense, an instance can be identified as a software-implemented virtual processing entity that provides the sensor data analysis. As an instance, one or more virtual entities can be invoked from the same code. Namely, one code defines one object in the form of an analysis application that performs and provides the sensor data analysis to the users. From this (common) code a plurality of instances can be instantiated. Because each instance uses the same code, changes applicable to all instances can be easily facilitated by changing the "central" code defining the object. At the same time, however and although each instance uses the same code, each instance remains dynamically and independently configurable. For example, each instance can be implemented by means of a virtual machine (VM).

At this point it should be noted that the interplay between the plurality of instances on the one side, and the one data store on the other has various advantageous effects. Firstly, it is not common to let a plurality of analysis instances access the same data. On the contrary, usually each analysis instance has its own data to be accessible. However, by letting the plurality of analysis instances access the same data repository, the configuration and maintenance of the data storage can be substantially facilitated. Moreover, it can be independently and dynamically defines what instance has access to what data. As compared to conventional systems, this provides the effect that no data needs to be transferred (copied) amongst the usual plurality of data bases. Rather, a reconfiguration of an instance can be sufficient.

Furthermore, each instance can be given an exclusive subset of the stored sensor data for access. This would initially map a plurality of analysis systems each with its own data to the system and concepts of the present disclosure. Aside the "cross"-access from one or more instances to the same data as described above, there is the additional possibility to invoke instances with a so-to-speak superordinate access. Namely one or more instances can be given full access to most of or all of the sensor data, which, in turn, allows for obtaining a superordinate analysis tool providing analysis results which can then consider more than a subset of the distributed data acquisition equipment and its corresponding sensor data. In other words, the embodiments disclosed herein allow for running several—as such independent—data acquisition systems including sensor data analysis and, at the same time, superordinate levels of data access and analysis. This without any cross-access to data amongst several individual data storages or data bases.

Figure 3:
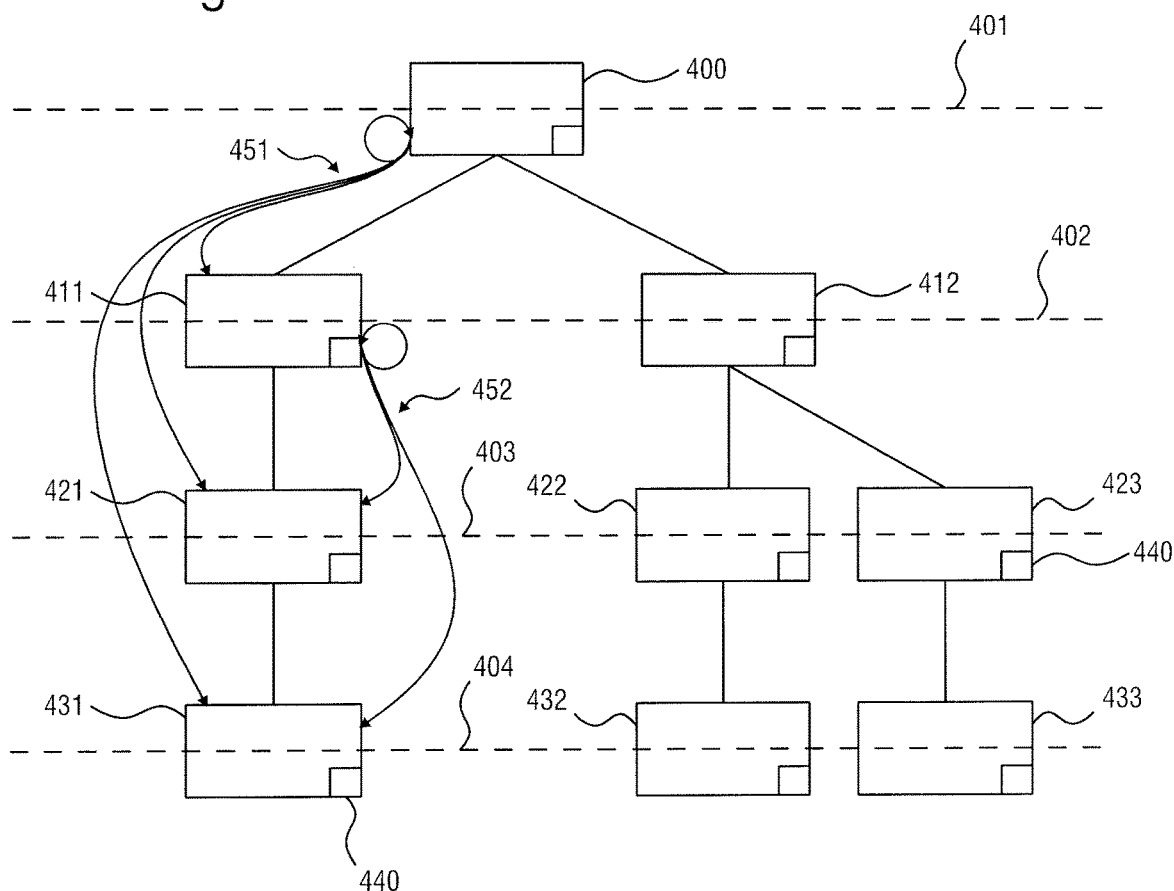
FIG. 3 shows a schematic representation of a hierarchical structure employed in embodiments.

FIG. 3 shows a schematic representation of a hierarchical structure employed in embodiments disclosed herein, and more specifically, in the data storage that provides the data for providing sensor data analysis. In one embodiment, the shown structure in FIG. 3 is employed by the processing entity 50 and the data storage of FIGS. 1 and 2. Firstly, a root node 400 is located at a top hierarchical level 401, under which subordinate levels (sub-levels) 402, 403, etc. follow. The level can be identified by some kind of depth metric representing as an integer the depth (distance) from the root level 401 and starting there for example with a value of n=1. Assuming that the shown structure has only the four shown levels 401 to 404, a depth value for n would be 4.

Each of the nodes between the root level 401 and (usually) the penultimate level 403, namely nodes 411, 412, 421, 422, and 423 are associated with one locality. The hierarchical structure of these nodes also represents the actual structure of the associated localities, so that a subordinate level is associated with a subordinate locality in the sense that the superordinate locality includes one or more subordinate localities. For example, subordinate nodes 422 and 423 may be associated to rooms that are both located on the same floor (superordinate locality) being, in turn, associated to the superordinate node 412. The nodes 431 to 433 at the lowest level 404 represent the sensors that are located in the localities associated to the superordinate nodes 421 to 423. For example, the room associated as a locality to node 422 accommodates a sensor being associated to node 432. Of course, one locality may accommodate more than one sensor which would result in a one-to-many relationship from the penultimate to the bottom level. Likewise, a locality may have no sensor at all, so that it is carried by the structure as a sensor-less locality which would be then represented by a node of the bottom level. Further, there may additional nodes below the hierarchy level of sensors and the level structure (tree) may be asymmetric in the sense that the hierarchy ends with different levels corresponding to each respective sub-tree.

Each node may also include metadata 440 that stores additional information in the form of one or more field. These fields, in turn, store values indicating a node type that reflects the associated locality type (e.g. building, floor, etc.), a unique node identifier (e.g. integer), and/or a node name which can be used as a clear text identifier for any kind of involved user interfaces. A corresponding database table to the structure as shown and described in conjunction with FIG. 3 is exemplified below, where each row in the database table corresponds to an edge between two nodes in the tree:

| Parent | /Ref. | Child | /Ref. | MetaData |
|---|---|---|---|---|
| NULL | | Company | /400 | ChildType=Company |
| Company | /400 | Locality A | /411 | ChildType=Customer |
| ... | | ... | | |
| Locality F | /421 | Sensor 1 | /431 | ChildType=Dispenser |

In a sense, the structure of the implementation of the database is thus related to and dependent on the structure of the distributed data acquisition equipment. The actual arrangement of the distributed data acquisition equipment in the form of a plurality of sensors is thus reflected in the database structure which therefore maps the actual arrangement and configuration of the distributed data acquisition equipment.

In such a configuration, many operations can be performed on sub-trees, i.e. on all sub-nodes subordinate to some starting node. For example, the data base may be accessed for querying all the sensor data of all the sensors of one specific locality that is associated to one specific node. Such access may require a tracing from the starting node to all its last sub-nodes representing the individual sensors. This basic tree approach, however, may have the disadvantage that operations for finding all the respective child nodes of a parent node can be computational expensive. In a way, once the structure of the distributed data acquisition equipment becomes large, a conventional tree approach may be prohibitive, since a sufficiently fast and efficient access to the data for analysis may be impossible.

However, according to certain embodiments, it is stored for each node a relationship to itself and to all its sub-nodes. These relationships are represented in FIG. 3 as edges or bunches 451, 452 of references added for each node to itself and their respective sub-nodes (for the sake of clarity, only reference bunches 451, 452 are shown for nodes 400 and 411). This modification provides constant complexity for most operation, such as finding the sub-tree of a given node, because each sub-node at all corresponding subordinate levels are referenced directly by the stored relationship.

At the same time, the storage of these relationships can as such increase the number of rows in the corresponding database table, with a worst-case complexity proportional to $n^2$, namely the square of depth n. However, in combination with configuring the nodes as being associated to localities, and, as a consequence, the number of hierarchical levels of real world localities being low, the storage of all the relationships becomes possible and the complexity with a sufficiently low n can be accepted. For example, it can be safely assumed that most buildings have less than 1000 floors or one floor will have less than 1000 rooms, and, at the same time, most configurations of distributed data acquisition equipment can be mapped by a number of levels in the order of at most 10.

In other words, by localizing distributed data acquisition equipment at a plurality of localities and by mapping the given structure of the localities (with all its implied requirements) to a specific data storage configuration, efficient and fast access to sensor data becomes possible for analysis, despite a possibly large number of individual sensors. The embodiments thus acknowledge the results from the domain of buildings, floors and other geographical locations, in which the maximum tree depth is usually not large. Furthermore, the associated nodes will be added, deleted, and/or changed in an organized manner and, therefore, the system may not need to respond to frequent or ad-hoc changes of the configuration. Thus, the corresponding graph can be still regarded as a directed acyclic graph.

As far as the actual implementation in the form of one or more database tables is concerned, one table can include a row for each edge in the tree. Although in this case it may be necessary to consider a considerable number of rows, which, however, is acceptable due to the specific connection between the database configuration and the actual real-world configuration of the distributed data acquisition equipment.

Figure 4:
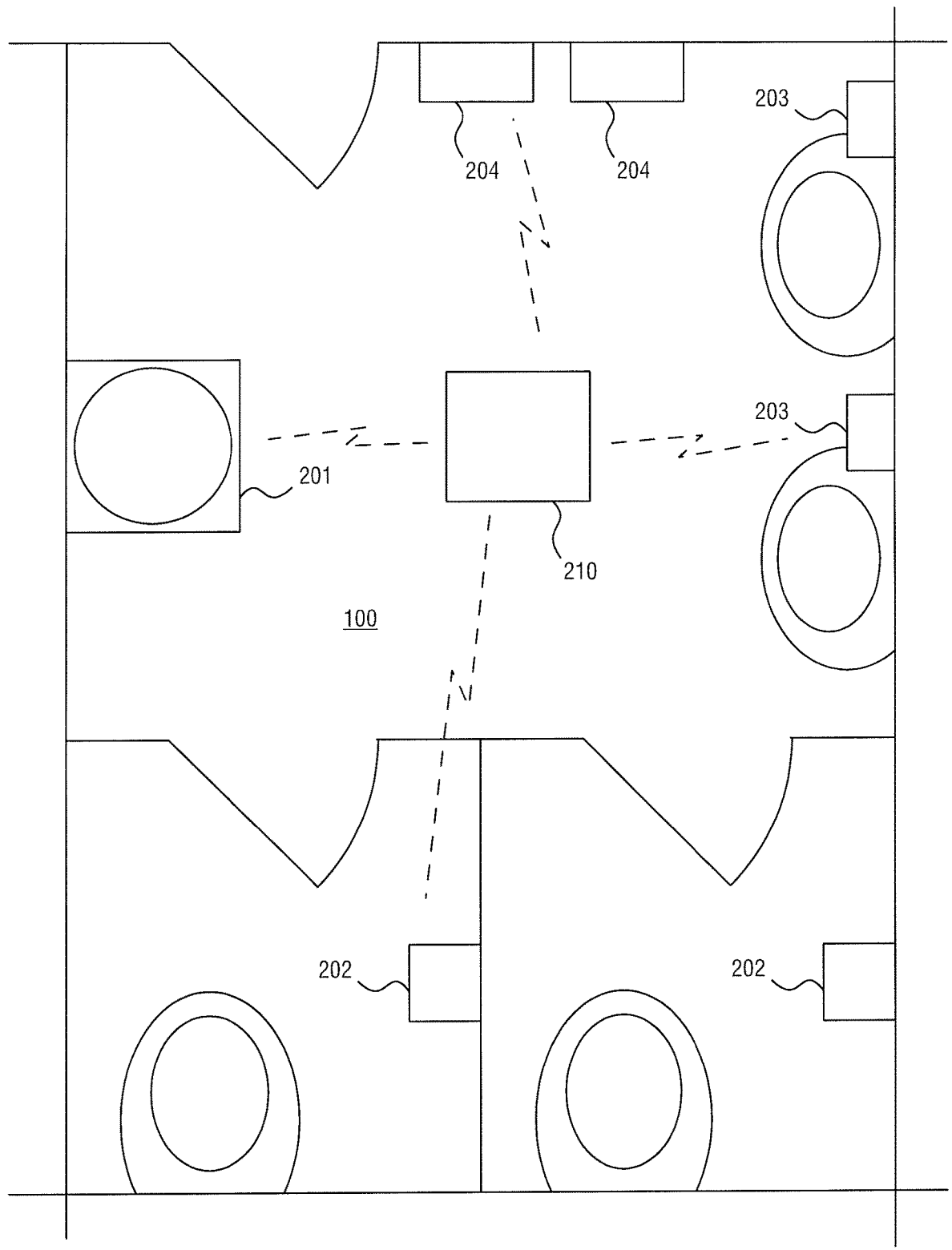
FIG. 4 shows a schematic view of a locality with a plurality of installed sensors.

FIG. 4 shows a schematic view of one exemplary locality with a plurality of installed sensors according to a further embodiment. More specifically, the shown locality is one from the field of facility management and in the form of a restroom 100. Restroom 100 has equipment from which consumables may be dispensed, including bathroom tissue dispensers 202, handwash dispensers 203, and hand towel dispensers 204. During usage of the restroom, the mentioned dispensers 202, 203, and 204 may become depleted, while waste bins 201 may become filled.

In conventional facility management approaches, a maintenance worker or team would periodically check restroom 100, including checking the levels in the dispensers 202, 203, and 204 and the levels of waste in each of waste bins 201. The maintenance worker may make a judgment as to whether any of the resources are likely to need replenishment in the period before his next scheduled maintenance visit, and he may replenish those resources which are deemed to require such replenishment, provided that the worker has sufficient consumables on the maintenance cart. The maintenance worker may also empty bins 201, provided that the worker has sufficient remaining capacity for waste on the maintenance cart. If either the capacity for waste or the remaining resources on the cart are insufficient, the worker may either not replenish the resources or may adjust his route to visit a central storage location to resupply the cart before continuing.

In the present embodiment, restroom 100 also includes a data collection unit 210 which carries out short-range communication (e.g. IrDA, IEEE802.15.4, Zigbee, RF4CE, SP100, IEEE802.11, Bluetooth(TM), or similar technologies) with sensors installed in dispensers 202, 203, and 204, and in waste bins 201. These sensors thus form part of distributed data acquisition equipment and measure—respectively—towel-, tissue-, soap consumption-, and filling levels. In general, the measured quantities are rendered as sensor data which is suitable to be transmitted to data collection unit 210, and from there to some central entity, such as the interface 30 or system 1 as described in conjunction with FIGS. 1 and 2.

In general, however, also the sensors in the shown one locality of restroom 100 form part of distributed data acquisition equipment in the sense of many distributed data sources that provide individual sensor data to be collected and analyzed. Specifically the latter analysis can be identified as an important aspect, since—as is clear from the present example of many restrooms with many dispensers etc.—the number of data sources in practical systems can be large. As a consequence, the data from one individual sensor may as such not provide a substantial benefit. Only looking at a larger number of sensors can provide—by means of corresponding analysis and processing—data that is suitable for taking decisions regarding control of the system that is subject to distributed data acquisition. For example, the processed data from the analysis can form the basis for calculating efficient refill cycles, routes, and stock targets, which, in turn, will yield substantial improvements with regard to energy, resource and cost efficiency.

Figure 5:
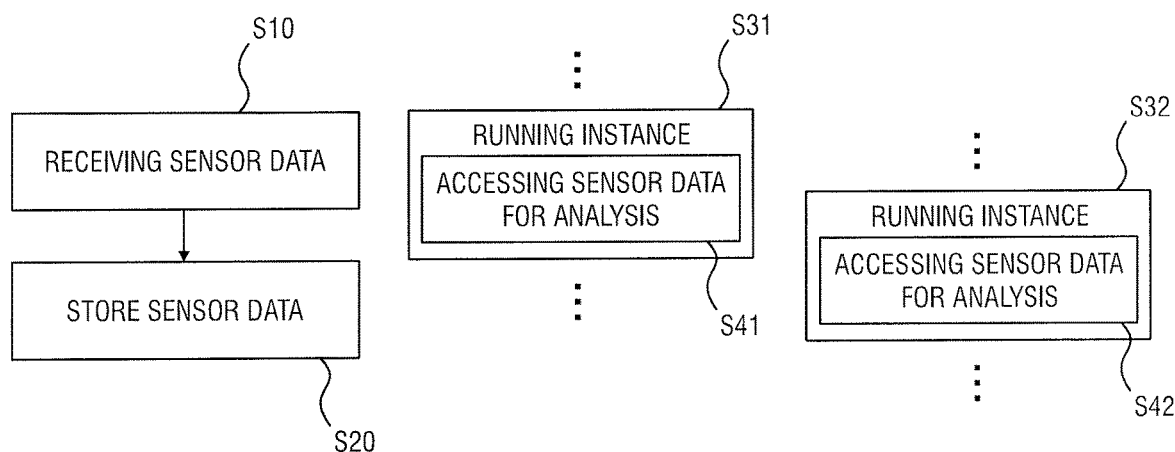
FIG. 5 shows a schematic flow chart of a general method embodiment.

FIG. 5 shows a schematic flow chart of a general method embodiment. These embodiments implement generally a method for providing sensor data analysis to a plurality of users. According to the general method embodiments, a step S10 is provided of receiving sensor data from a plurality of sensors distributed over a plurality of localities, wherein a locality being associated with one or more sensors. In a step S20 said sensor data is stored in association with a plurality of nodes, one node being associated to one locality, and sensor data from one specific sensor being associated to the corresponding node, and to store for each node a relationship to itself and to all its sub-nodes as part of a hierarchical structure of said nodes.

At the same time, before, and/or after steps S10 and S20, the method includes at least a step S31 of running one instances for a user, for example instance 61 as described in conjunction with FIG. 1, wherein that instance accesses in step S41 the stored data for analyzing the sensor data in response to a user request. Generally, however, the embodiments consider running one or more instances for each of a plurality of users, wherein each instance accesses the stored data for analyzing the sensor data in response to a user request. Specifically, the method—besides steps S31 and S32—involves a further step S32 of running a further instance, for example instance 62 of FIG. 2. Likewise, this instance accesses in step S42 again the stored data for analysis.

The shown flow chart is to demonstrate the dynamic and independent character of both the reception and storage of the sensor data as well as the running of one or more instances that access this data. For example, an instance can be invoked (started), suspended or removed (cancelled) at any given time and independent of the other instances running and independent from the process of (continuously) receiving and storing sensor data. In this way, the storage of the output from distributed data acquisition equipment and its analysis are decoupled from each other, which, in turn, allows for the flexible provision of analysis instances, for example on the basis of user needs and/or requests.

Although detailed embodiments have been described, these only serve to provide a better understanding of the invention defined by the claims, and are not to be seen as limiting.

The invention claimed is:

1. A system for providing sensor data analysis to a plurality of users, the system comprising:
    an interface for receiving sensor data from a plurality of sensors distributed over a plurality of localities, a locality being associated with one or more sensors;
    a data storage configured to store said sensor data in association with a plurality of nodes, one node being associated to one locality, and the sensor data from one specific sensor being associated to the corresponding node, and to store for each node a relationship to itself and to all its sub-nodes as part of a hierarchical structure of said nodes that reflects an arrangement of the localities associated with said nodes; and
    a processor configured to run one or more instances of an analysis application for each of a plurality of users, each instance being dynamically and independently configurable and being independent from receiving and storing said sensor data, and each instance accessing said data storage for analyzing the sensor data in response to a user request.

2. The system according to claim 1, wherein each locality is a local entity being defined by a boundary, a position, a location, or spatial information.

3. The system according to claim 1, wherein each instance is a software-implemented virtual processing entity.

4. The system according to claim 1, wherein each instance has access rights to said data storage defining a scope of the sensor data that is accessible to the instance for sensor data analysis.

5. The system according to claim 4, wherein the access rights of a superordinate instance define a broader scope of sensor data as compared to the access rights of remaining instances.

6. The system according to claim 1, wherein the hierarchical structure of said nodes represents an actual structure of the associated localities and/or sensors.

7. The system according to claim 1, wherein a node comprises metadata storing additional information in the form of one or more fields.

8. The system according to claim 7, wherein a field of said metadata stores a unique node identifier.

9. The system according to claim 1, wherein said sensors form part of distributed data acquisition equipment sensing a figure in relation to a consumable.

10. The system according to claim 1, wherein each instance is invoked from the same code and accesses the same data repository in said data storage for analyzing the sensor data in response to the user request.

11. A method for providing sensor data analysis to a plurality of users, the method comprising:
    receiving sensor data from a plurality of sensors distributed over a plurality of localities, a locality being associated with one or more sensors;
    storing said sensor data in association with a plurality of nodes, one node being associated to one locality, and sensor data from one specific sensor being associated to the corresponding node, and to store for each node a relationship to itself and to all its sub-nodes as part of a hierarchical structure of said nodes that reflects an arrangement of the localities associated with said nodes; and
    running one or more instances of an analysis application for each of a plurality of users, each instance being dynamically and independently configurable and being independent from receiving and storing said sensor data, and each instance accessing said stored data for analyzing the sensor data in response to a user request.

12. The method according to claim 11, wherein each locality is a local entity being defined by a boundary, a position, a location, or spatial information.

13. The method according to claim 11, further comprising defining, for each instance, access rights to the stored sensor data defining the sensor data that is accessible to the instance for sensor data analysis.

14. The method according to claim 13, further comprising running a superordinate instance having access rights defining a broader scope of sensor data as compared to the access rights of remaining instances.

15. The method according to claim 11, further comprising storing metadata for a node, the metadata storing additional information in the form of one or more fields.

16. The method according to claim 15, wherein a field of said metadata stores a unique node identifier.

17. The method according to claim 11, further comprising invoking, suspending, or removing an instance while running a remaining instance and receiving and storing said sensor data.

18. The method according to claim 11, wherein said sensor data is stored in a data storage, and each instance is invoked from the same code and accesses the same data repository in said data storage for analyzing the sensor data in response to the user request.

* * * * *